United States Patent [19]

Hathaway et al.

[11] Patent Number: 5,219,628
[45] Date of Patent: Jun. 15, 1993

[54] MICROWAVABLE THERMOPLASTIC CONTAINERS

[75] Inventors: Paul E. Hathaway, Midland; Phillip A. Wagner, Essexville, both of Mich.

[73] Assignee: The Dow Chemical Company, Midland, Mich.

[21] Appl. No.: 852,454

[22] Filed: Mar. 16, 1992

[51] Int. Cl.$^5$ .................. B32B 1/08; B32B 27/32; A21D 10/02; C08G 63/91
[52] U.S. Cl. .................. 428/36.9; 428/35.7; 428/35.9; 428/36.4; 428/36.5; 428/36.8; 428/36.91; 428/319.7; 428/515; 428/521; 426/107; 426/127; 426/415; 525/64; 525/74; 525/207; 525/269; 525/301
[58] Field of Search ............ 428/36.91, 36.9, 35.9, 428/35.7, 36.8, 36.5, 36.4, 515, 521, 319.7; 525/64, 269, 301, 74, 207; 426/107, 127, 415

[56] References Cited

U.S. PATENT DOCUMENTS

| | | | |
|---|---|---|---|
| 4,505,962 | 3/1985 | Lu | 428/319.7 |
| 4,579,774 | 4/1986 | Kuwazuru et al. | 428/319.7 |
| 4,987,170 | 1/1991 | Ishida et al. | 525/207 |
| 5,034,449 | 7/1991 | Mallikarjun | 525/74 |

Primary Examiner—George F. Lesmes
Assistant Examiner—Kathryne E. Shelborne

[57] ABSTRACT

A multi-layer container suitable for use in microwave cooking of food comprising a substrate layer of a thermoplastic polymer that is not suitable for contact with foods or hot foods, and an inner protective layer designed to contact the food, said inner layer comprising a blend of a styrene/maleic anhydride copolymer and a polymer selected from the group consisting of polystyrene, rubber modified polystyrene, polymethyl methacrylate, rubber modified polymethyl methacrylate, polypropylene, and mixtures thereof.

9 Claims, No Drawings

MICROWAVABLE THERMOPLASTIC CONTAINERS

BACKGROUND OF THE INVENTION

1. Field of the Invention

This invention relates to containers, adapted for holding food, which are suitable for use in microwave oven cooking.

2. Description of the Prior Art

It is known in the art to produce various shaped articles from foamed and unfoamed thermoplastic materials such as polystyrene sheet or impact modified polystyrene sheet (i.e. high impact polystyrene sheet) whether foamed or unfoamed, by thermoforming methods. Many such articles are containers used for packaging foods.

However, many thermoplastic containers are melted by cooking foods or cracked by fats and oils in foods and cannot be used to package foods that are to be heated in a microwave oven. In particular, polystyrene, polycarbonate, polymethyl methacrylate or poly(p-methylstyrene) containers are not suitable for microwave cooking. In general, containers made from thermoplastic polymers or copolymers with a softening temperature below 212° F. (100° C.) are not sufficiently resistant to hot foods when heated in a microwave oven.

Microwavable thermoplastic containers are described in U.S. Pat. Nos. 4,335,181, and 4,505,961. The containers disclosed in these patents were made from polymers such as polystyrene or poly(p-methylstyrene) that are not in themselves sufficiently heat resistant to maintain their structural integrity under microwave cooking conditions. Loss of structural integrity is said to be avoided by laminating to the substrates a protective film such as polyacrylonitrile, polyethylene terephthalate or a cellulose ester such as cellulose acetate or cellulose acetate propionate. However such polymers are not readily coextrudable over vinylaromatic polymers or the resulting structures are not as easily thermoformable as are structures of vinylaromatic polymers. Thus there still exists a need in the art for microwavable thermoplastic containers that are adaptable to volume production in an economical manner.

BRIEF DESCRIPTION OF THE INVENTION

This invention relates to a multi-layer container suitable for use in microwave cooking of food comprising a substrate layer of a thermoplastic polymer that is not suitable for contact with foods or hot foods, and an inner protective layer designed to contact the food, said inner layer comprising a protective polymer that is a blend of a styrene/maleic anhydride copolymer and a polymer selected from the group consisting of polystyrene, rubber modified polystyrene, polymethyl methacrylate, rubber modified polymethyl methacrylate, polypropylene, and mixtures thereof. Resistance to heat deformation and/or environmental stress crack resistance of the coated containers of the invention has been found to be surprisingly improved compared to uncoated containers.

In a preferred embodiment of the invention, another layer of the same or a different protective polymer is also provided on the remaining surface (i.e. the outer surface) of the container thereby resulting in a three layer structure. Such structures possess superior strength and heat resistance properties compared to 2-layer structures.

The containers of this invention can be prepared by first forming a two or three layer sheet by coextrusion or by coating one or both sides of a preformed substrate sheet with the styrene/maleic anhydride copolymer blend. Thereafter, the multilayer sheet is thermoformed into the desired container configuration according to known techniques.

DETAILED DESCRIPTION

The substrate layer of the container (which may either form an internal layer of a 3-layer construction or the exposed bottom layer of a 2-layer construction) is prepared from a material which is not itself suitable for microwave cooking, for example foamed or unfoamed thermoplastic polymers of relatively low softening point, or polymers that lack sufficient chemical resistance to fats and oils.

The inner or protective layer which contacts the food comprises a heat and grease or oil resistant blend as previously disclosed. Especially preferred is a blend of a styrene/maleic anhydride copolymer with polystyrene or high impact polystyrene (HIPS). In addition to providing the necessary heat resistance, the protective layer provides improved resistance to fats and oils which may be present in the food.

The substrate polymers contemplated herein are generally polymers and copolymers with a softening temperature below 212° F. (100° C.), or higher melting polymers that are not acceptable for food contact, especially polymers lacking in environmental stress crack resistance. Such polymers include polystyrene, rubber modified polystyrene (HIPS), poly(p-methylstyrene), polymethyl methacrylate, rubber modified polymethyl methacrylate, polycarbonate, polyphenylene ethers, crystalline polyethylene terephthalate, polypropylene, and mixtures thereof. A preferred substrate polymer comprises polystyrene or HIPS due to the ease of thermoforming. Highly preferred substrate polymers comprise high impact polystyrene and may be the same as or different from the HIPS resin preferably employed in the blend of the protective layer.

As is well known to the skilled artisan, the substrate layer can additionally incorporate reground thermoplastics resulting from trimming and forming operations during the thermoforming process. Under actual operating conditions, up to about 90 percent reground thermopolymer based on total blend weight may be mixed with virgin resin and used in the substrate layer, whether the same is foamed or unfoamed. For this reason the substrate resin generally will comprise a mixture of thermopolymers including the styrene/maleic anhydride copolymer used in the protective layer. Because of its compatibility with such resins, it is generally preferred that the substrate resin comprise HIPS. Despite the ability to incorporate some styrene/maleic anhydride copolymer in the substrate resin, generally the amount so incorporated in this manner is insufficient to result in improved heat resistance sufficient by itself to resist microwave cooking temperatures.

The substrate may be foamed to add thermal insulating properties and increased strength to the microwavable container. Foaming of thermoplastics is accomplished by known techniques such as by incorporating a volatile blowing agent into the molten polymer and allowing the polymer mass to expand before cooling to a solid state.

Suitable styrene/maleic anhydride copolymers for use herein are formed by reacting styrene monomers and maleic anhydride in a suitable reactor under free radical polymerization conditions. Desirably the maleic anhydride is added continuously at about the rate of reaction to a stirred reactor to form a copolymer having a uniform maleic anhydride content. Suitable polymers have a maleic anhydride content of from 2 to 25 weight percent, preferably from 5 to 15 weight percent, and are commercially available from Arco Polymers, Inc., under the trade designation Dylark. Rubber modified styrene/maleic anhydride copolymers may also be used in the present invention, but are not preferred.

Preferred resin blends for the protective layer(s) are those containing from 10 to 90 weight percent styrene/maleic anhydride copolymer, preferably 50 to 80 weight percent.

The rubber component of the various rubber modified polymers, especially rubber modified vinylaromatic polymers used in either the substrate or in the blend of the protective layer may be any suitable rubbery polymer, i.e., polymers having a Tg less than 0° C., preferably less than −25° C. Examples include homopolymers and copolymers of conjugated dienes, alkyl acrylate homopolymers and copolymers, including graft copolymers, ethylene/propylene/diene copolymers and mixtures thereof. Preferred polymers contain a polybutadiene or styrene/butadiene copolymer rubber in an amount for 1 to 20 weight percent, preferably 5 to 15 weight percent. The styrene/butadiene copolymer rubber may be either a block copolymer or random copolymer rubber, preferably containing from 1 to 20 weight percent styrene. A highly preferred rubber is polybutadiene.

While impact modified polymers for use herein may be prepared by blending the respective components, it is preferred to incorporate at least a portion of the rubber into the monomer feed stream of a solution or bulk polymerization reactor and polymerize the resulting solution under free radical polymerization conditions to thereby obtain a grafted rubber particle containing occlusions of the matrix polymer. Thereafter additional amounts of the same or a different rubbery polymer may be blended into the rubber modified vinylaromatic polymer. For example, blends of an emulsion polymerized small particle size rubber may be blended into the polymer to give a multi-modal rubber particle size distribution. Generally, polybutadiene rubbers produce rubber particle sizes in HIPS resins prepared by mass or solution polymerization techniques that are greater than 1.0 $\mu M$. Styrene/butadiene block copolymer rubbers typically produce rubber particles sizes in HIPS resins that are less than 1.0 $\mu M$. For the protective coating it is preferable to employ blends containing HIPS resins having rubber particle sizes from 1 to 5 $\mu M$, more preferably from 2 to 3.5 $\mu M$. Containers prepared from resin blends comprising such resins possess improved strength properties making them less prone to cracking and breakage. In applications where increased clarity of the protective layer is important, smaller rubber particle resins, i.e. HIPS resins having particle sizes less than 1 $\mu M$ are preferred.

The protective layers are generally from 0.005 to 2.0 mm in thickness, more preferably from 0.01 to 0.2 mm thick. The substrate layer is generally from 0.1 to 15 mm thick, preferably from 0.2 to 2 mm thick. Foamed substrate layers are generally thicker than unfoamed layers.

The manner by which sheet materials are prepared from the previously described polymers or blends is not an essential feature of this invention. Any of the methods well known in the art can be used, such as extrusion through a slot die, etc. The sheet can be oriented or non-oriented. As previously mentioned, coextrusion techniques are also suitably employed. Desirably, the protective coating layer spreads in the molten state across the surface of the substrate to form an even coating or the two resins can be coextruded to give a uniform laminated article. This result is easily achieved where the protective resin is a blend of the styrene/maleic anhydride copolymer with either polystyrene or HIPS and the substrate polymer is HIPS. The use of styrene/maleic anhydride copolymers alone as the protective layer does not achieve this desirable feature.

Where coextrusion is not employed, the heat resistant layer or layers can be applied to preformed substrate layers in a variety of ways including laminating and extrusion coating. Extrusion coating is preferred and can be accomplished by extruding a thin layer of the styrene/maleic anhydride copolymer containing blend onto the preformed foamed or unfoamed substrate. An added benefit of the present invention is the discovery that concave structures such as cups, tubs or the like, comprising an inner layer of the styrene/maleic anhydride copolymer based blend are much stronger than containers containing only polystyrene or other substrate polymer. An additional advantage in the present multiple layer construction is the relative ease of thermoforming the present containers compared to containers made entirely from styrene/maleic anhydride copolymers.

The manner by which foamed sheet, suitable for the substrate or inner layer is prepared is not an essential feature of this invention. General methods for preparing foamed sheet are well known to the skilled artisan and are discussed for example in U.S. Pat. Nos. 3,444,283 and 3,619,445, the teachings of which are incorporated herein by reference.

The processes of thermoforming to produce shaped articles are well known to those skilled in the art. A common method of thermoforming is vacuum forming. In this process the shaped articles produced by thermoforming the foamed or unfoamed sheet laminate can vary widely. Typical shapes that are utilizable include trays, tubs, bowls, cups, and the like. Such shaped articles are adaptable for packaging foods subject to heating in a microwave oven, especially fatty foods, such as hash, chili, stews, etc.

The invention is illustrated by the following nonlimiting examples. Unless stated to the contrary all parts and percentages are based on weight.

EXAMPLE 1

Heat resistant, styrene/maleic anhydride copolymer blends were prepared for coating onto substrates for further testing. Heat resistant blend #1 (HR[1]) was a blend of 70 parts styrene/maleic anhydride copolymer resin (Dylark 332 available from Arco Polymers, Inc.) and 30 parts general purpose polystyrene (Styron 666D, available from The Dow Chemical Company) prepared by tumble blending and then melt compounding the respective resins. The resulting blend contained 10 percent maleic anhydride. Heat resistant blend #2 (HR[2]) comprised 65 parts of a styrene/maleic anhydride copolymer resin (Dylark 332) and 35 parts of a high impact polystyrene resin containing 12.3 weight percent of a styrene/butadiene/styrene block copolymer rubber having a particle size of 0.3 μm. This blend contained 9 weight percent maleic/anhydride. The resulting blends were extrusion coated over one or both sides of substrates comprising a HIPS resin prepared by mass polymerization techniques, containing 5.5 percent of a polybutadiene rubber having a particle size of 1.8 μM. The thickness of the coated layers was 0.1 mm and the substrate thickness was adjusted to provide a total sheet thickness of 0.8 mm. Dishes were thermoformed from the coextruded sheet and from uncoated sheet materials also having a thickness of 0.9 mm prepared from HR$^2$ alone and from the HIPS substrate resin alone. After thermoforming, the resulting bowls had average thickness of 0.6 mm, with cap layer thicknesses, where present, of 0.08 mm.

Test Procedure

The test procedure used to determine acceptable resistance to microwave cooking processes was to place 110 g. of a commercial prepared canned food (hash, chili or stew) into a thermoformed bowl and to heat the same, uncovered, in a microwave oven under full power (600 watts). After each minute of heating, the food was stirred thoroughly and the container inspected for deformation or blistering. The onset of blisters or deformation was considered to be a failure. The elapsed time in minutes before failure was observed was recorded for the various structures and resins tested. Results are recorded in Table I.

TABLE I

| Container | Time to Failure Food | | |
|---|---|---|---|
| | Hash | Chili | Stew |
| Single layer HIPS* | 0 | 0 | 0 |
| Monolayer HR$^1$/HIPS | 2 | 1 | 1 |
| Monolayer HR$^2$/HIPS | 1 | 1 | 1 |
| Dual layer HR$^2$/HIPS/HR$^2$ | 2 | 2 | 5 |
| Single layer HR$^2$* | 2 | 4 | 5 |

*Not an example of the invention.

As may be seen by reference to Table I failure of the HIPS substrate material occurs in less than one minute while all other bowls demonstrated improved heat resistance. Also, the double capped structure provided significantly longer time to failure than the single coated structure. For stew and hash, the double capped structure provided equivalent time to failure as did a monolayer structure of only the high heat resistant polymer blend. This result indicates that significant cost reduction can be achieved by use of coated structures without significant loss in heat resistance in the resulting bowls.

What is claimed is:

1. A multi-layer container suitable for use in microwave cooking of food comprising a substrate layer of a thermoplastic polymer that is not suitable for contact with foods or hot foods, and an inner protective layer designed to contact the food, said inner layer comprising a blend of a styrene/maleic anhydride copolymer and a polymer selected from the group consisting of polystyrene, rubber modified polystyrene, polymethyl methacrylate, rubber modified polymethyl methacrylate, polypropylene, and mixtures thereof.

2. A multi-layer container according to claim 1 wherein the substrate layer comprises polystyrene or rubber modified polystyrene.

3. A multi-layer container according to claim 1 wherein the inner layer comprises from 50 to 80 weight percent styrene/maleic anhydride.

4. A multi-layer container according to claim 1 wherein the rubber particles of the rubber modified polystyrene in the inner layer comprise particles having a volume average particle size from 1 to 5 μM.

5. A multi-layer container according to claim 1 wherein the styrene/maleic anhydride copolymer in the inner polymer layer comprises from 5 to 15 weight maleic anhydride.

6. A multi-layer container according to claim 1 additionally comprising an outer layer on the outside of the substrate layer comprising a blend of rubber modified polystyrene and a styrene/maleic anhydride copolymer.

7. A multi-layer container according to claim 6 wherein the inner layer and outer layer comprise the same heat resistant resin.

8. A multi-layer container according to claim 1 wherein the substrate layer is foamed.

9. A multi-layer container according to claim 6 wherein the substrate layer is foamed.

* * * * *